United States Patent
Ziat et al.

(10) Patent No.: US 11,093,932 B2
(45) Date of Patent: *Aug. 17, 2021

(54) MOBILE-MERCHANT PROXIMITY SOLUTION FOR FINANCIAL TRANSACTIONS

(71) Applicant: Apple Inc., Cupertino, CA (US)

(72) Inventors: Mehdi Ziat, San Francisco, CA (US); Kyle A. Diebolt, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 16/146,621

(22) Filed: Sep. 28, 2018

(65) Prior Publication Data

US 2019/0057361 A1   Feb. 21, 2019

Related U.S. Application Data

(63) Continuation of application No. 14/475,485, filed on Sep. 2, 2014, now Pat. No. 10,089,607.

(51) Int. Cl.
*G06Q 20/32* (2012.01)
*G06Q 20/38* (2012.01)
(Continued)

(52) U.S. Cl.
CPC ......... *G06Q 20/3278* (2013.01); *G06Q 20/02* (2013.01); *G06Q 20/3227* (2013.01);
(Continued)

(58) Field of Classification Search
None
See application file for complete search history.

(56) References Cited

U.S. PATENT DOCUMENTS 8,231,055 B2   7/2012   Wen
8,805,746 B2   8/2014   Hoffman et al.
(Continued)

FOREIGN PATENT DOCUMENTS

CN          102983886 A     3/2013
CN          103562973 A     2/2014
KR     10-2011-0049765      5/2011

OTHER PUBLICATIONS

David M. Monteiro, Joel J. P. C. Rodrigues, Jaime Lloret, Sandra Sendra, "A hybrid NFC-Bluetooth secure protocol for Credit Transfer among mobile phones", Feb. 22, 2013 (Year: 2013).*

(Continued)

*Primary Examiner* — Jacob C. Coppola
*Assistant Examiner* — Timothy Paul Sax
(74) *Attorney, Agent, or Firm* — Sterne, Kessler, Goldstein & Fox P.L.L.C.

(57) ABSTRACT

In order to facilitate conducting a financial transaction via wireless communication between an electronic device (such as a smartphone) and another electronic device (such as another smartphone), a secure element in the electronic device may generate, using an encryption key associated with the secure element, a signed blob based on a transaction amount and a merchant identifier. Then, the electronic device communicates connection information between the electronic device and the other electronic device. Moreover, the electronic device may establish a connection between the electronic device and the other electronic device based on the connection information, and may concurrently provide the signed blob to the other electronic device. After receiving a signed transaction blob from the other electronic device using the connection (which includes information needed to conduct the financial transaction), the electronic (Continued)

device provides the information to a server to conduct the financial transaction.

18 Claims, 7 Drawing Sheets

(51) Int. Cl.
    *G06Q 20/40* (2012.01)
    *G06Q 20/02* (2012.01)
    *G06Q 20/22* (2012.01)

(52) U.S. Cl.
    CPC ..... *G06Q 20/38215* (2013.01); *G06Q 20/401* (2013.01); *G06Q 20/223* (2013.01)

(56) References Cited

U.S. PATENT DOCUMENTS

| | | |
|---|---|---|
| 2002/0150147 A1 | 10/2002 | Liang |
| 2004/0059780 A1* | 3/2004 | Giannetti ............... H04L 67/327 709/203 |
| 2007/0156436 A1 | 7/2007 | Fisher et al. |
| 2009/0034498 A1* | 2/2009 | Banerjea ............... H04W 76/15 370/338 |
| 2009/0216681 A1 | 8/2009 | McCown |
| 2010/0223145 A1* | 9/2010 | Dragt .................... G06Q 20/202 705/17 |
| 2011/0251910 A1 | 10/2011 | Dimmick |
| 2012/0095852 A1 | 4/2012 | Bauer et al. |
| 2012/0116887 A1 | 5/2012 | Norair |
| 2012/0143706 A1 | 6/2012 | Crake et al. |
| 2012/0295540 A1* | 11/2012 | Hong ................. H04M 1/72412 455/41.1 |
| 2012/0297204 A1 | 11/2012 | Buer |
| 2013/0060618 A1 | 3/2013 | Barton et al. |
| 2013/0080276 A1 | 3/2013 | Granbery |
| 2013/0191290 A1 | 7/2013 | Glendenning |
| 2013/0260734 A1 | 10/2013 | Jain et al. |
| 2014/0108256 A1 | 4/2014 | Bircher-Nagy et al. |
| 2014/0122344 A1 | 5/2014 | Foulds et al. |
| 2014/0222688 A1 | 8/2014 | Haggerty et al. |
| 2014/0250008 A1 | 9/2014 | Dundas et al. |
| 2015/0134561 A1* | 5/2015 | Ashley ................... H04W 4/80 705/342 |
| 2015/0319151 A1 | 11/2015 | Chastain et al. |
| 2016/0063490 A1 | 3/2016 | Ziat et al. |

OTHER PUBLICATIONS

European Search Report and Search opinion directed to related European Patent Application EP 15181631.1; dated Nov. 25, 2015; 11 pages.

EMVCo. LLC, "Kernel 3 Specification. Version 2.4" In: "EMV Contactless Specifications for Payment Systems. Book C-3". Feb. 2014; 189 pages.

Machine translation of Korean Patent Publication No. KR 10-2011-0049765; 65 pages.

Secretariat@globalplatform: "White Paper GlobalPlatform's Proposition for NFC Mobile Secure Element Management and Messaging", Apr. 30 2009, Retrieved from the Internet: http://www.sicherungssysteme.net/fileadmin/GlobalPlatform_NFC_Mobile_White_Paper.pdf.

European Communication pursuant to Article 94(3) from related European Patent Publication No. EP 2993633 A1, dated Feb. 27, 2018.

* cited by examiner

MOBILE-MERCHANT PROXIMITY SOLUTION FOR FINANCIAL TRANSACTIONS

RELATED APPLICATION

The instant application is a continuation of and hereby claims priority to U.S. patent application Ser. No. 14/475,485, filed Sep. 2, 2014, now allowed, and is incorporated by reference herein in its entirety.

BACKGROUND

Field

The described embodiments relate to, inter alia, wireless communications, wireless electronic devices, and techniques for financial transactions conducted by electronic devices via wireless communication.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth® from the Bluetooth Special Interest Group of Kirkland, Wash.), and/or another type of wireless interface (such as a near-field-communication interface). Because of the popularity of these electronic devices and the convenience provided by this wireless-communication capability, there is increasing interest in using electronic devices to conduct financial transactions.

One approach for using cellular telephones (and, more generally, portable electronic devices) to conduct financial transactions is based on near-field communication. In particular, during a financial transaction a user may bring their cellular telephone in proximity to a point-of-sale terminal. When the user does this, financial information (such as information associated with the user's credit card) may be wirelessly communicated to the point-of-sale terminal.

In spite of the considerable effort already devoted to the development of technology in the area of wireless financial transactions and related areas, further improvements are desirable.

SUMMARY

The described embodiments relate to an electronic device that includes: an antenna; an interface circuit that wirelessly communicates with another electronic device (e.g., using near-field communication and another communication protocol); and a secure element. During operation, the secure element: receives a transaction amount associated with a financial transaction; generates, using an encryption key associated with the secure element, a signed blob based on the transaction amount, a merchant identifier and, optionally, a transaction identifier; and communicates, via the interface circuit, connection information between the electronic device and the other electronic device. Moreover, the secure element: establishes, via the interface circuit, a connection between the electronic device and the other electronic device based on the connection information; provides, via the interface circuit, the signed blob to the other electronic device; and receives, via the interface circuit, a signed transaction blob from the other electronic device using the connection, where the signed transaction blob includes the transaction amount, the merchant identifier, financial-account information that specifies a financial account (such as one associated with a credit card) and, optionally, the transaction identifier. Then, the secure element provides, via the interface circuit, information associated with the signed transaction blob to a server to conduct the financial transaction.

In some embodiments, the secure element: provides, via the interface circuit, the signed blob to the server; and prior to providing the signed blob, receives, via the interface circuit, a confirmation from the server that the electronic device is authorized to conduct the financial transaction.

Note that the connection information may be communicated via a near-field-communication protocol when the electronic device and the other electronic device are proximate to each other. Moreover, communication via the connection may involve a communication protocol that is other than the near-field communication protocol (such as Bluetooth®, WiFi® or a cellular-telephone communication protocol).

Furthermore, establishing the connection and providing the signed blob may occur concurrently.

Additionally, the server may be associated with a third party that is other than users of the electronic device and the other electronic device. For example, the third party may include a provider of the electronic device. Alternatively, the third party may include a payment network that processes payment for the financial transaction, and the payment may be processed using the information.

Note that the information may include the signed transaction blob. Alternatively, the secure element may decrypt the signed transaction blob using an encryption key associated with the other electronic device, and may extract the information.

In some embodiments, prior to receiving the transaction amount, the secure element: receives authentication information associated with a user of the electronic device; and authenticates the user based on the authentication information and stored authentication information.

Moreover, the secure element may receive, via the interface circuit, confirmation that the financial transaction was completed from the server. Then, the secure element may provide, via the interface circuit, the confirmation to the other electronic device using the connection.

Another embodiment provides a computer-program product for use with the electronic device described previously. This computer-program product includes instructions for at least some of the operations performed by the electronic device.

Another embodiment provides the secure element described previously.

Another embodiment provides a method for conducting the financial transaction with the other electronic device described previously, which may be performed by a processor in the secure element in the electronic device. During the method, the electronic device: receives the transaction amount associated with the financial transaction; generates, using the encryption key associated with the secure element, the signed blob based on the transaction amount, the merchant identifier and, optionally, the transaction identifier; and communicates the connection information between the electronic device and the other electronic device. Then, the electronic device: establishes the connection between the electronic device and the other electronic device based on the connection information; provides the signed blob to the other electronic device; and receives the signed transaction blob from the other electronic device using the connection, where the signed transaction blob includes the transaction amount, the merchant identifier, financial-account information that specifies the financial account and, optionally, the transaction identifier. Next, the electronic device provides information associated with the signed transaction blob to the server to conduct the financial transaction.

Another embodiment provides the other electronic device described previously. The other electronic device may perform counterparty operations for at least some of the operations performed by the electronic device.

This Summary is provided merely for purposes of reviewing some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
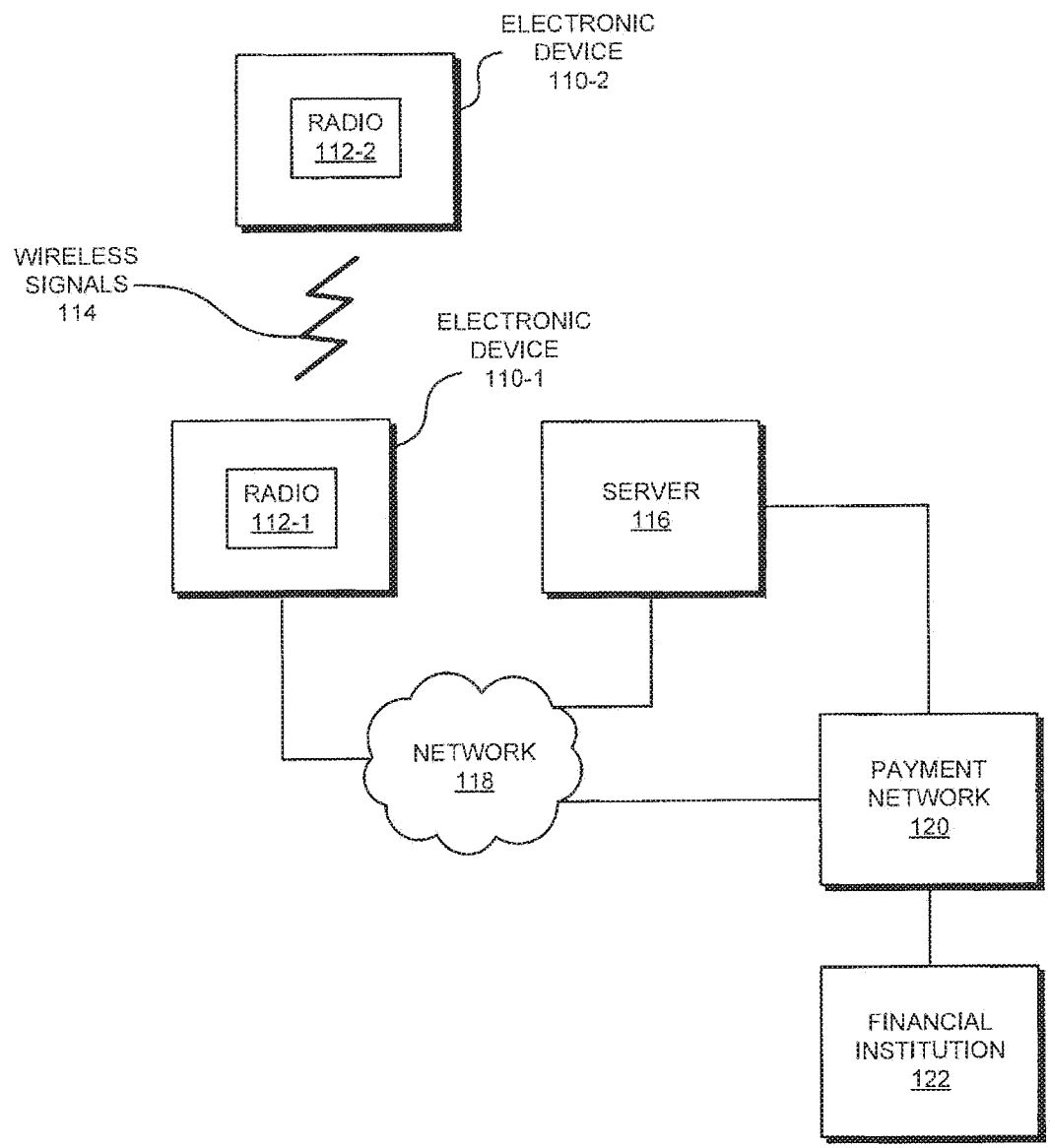
FIG. 1 is a block diagram illustrating electronic devices wirelessly communicating during a financial transaction in accordance with an embodiment of the present disclosure.

Table 1 provides track 1 and track 2 financial-account information that may be used to determine a unique transaction identifier in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION OF THE INVENTION

In order to facilitate conducting a financial transaction via wireless communication between an electronic device (such as a smartphone) and another electronic device (such as another smartphone), a secure element in the electronic device may generate, using an encryption key associated with the secure element, a signed blob based on a transaction amount, a merchant identifier and, optionally, a transaction identifier. Then, the electronic device communicates connection information between the electronic device and the other electronic device. Moreover, the electronic device may establish a connection between the electronic device and the other electronic device based on the connection information, and may concurrently provide the signed blob to the other electronic device. After receiving a signed transaction blob from the other electronic device using the connection (which includes information needed to conduct the financial transaction), the electronic device provides the information to a server to conduct the financial transaction.

In this way, the financial-transaction technique implemented by the electronic device may provide a flexible and simple approach for conducting secure, wireless financial transactions with other electronic devices. In particular, the electronic device may function as a mobile point-of-sale terminal, and may allow the financial transaction to be conducted even when, initially, there is no connection between the electronic device and the other electronic device. For example, the connection information and the signed blob may be conveyed in packets transmitted and received by radios in the electronic device and the other electronic device using a near-field communication protocol (from the NFC Forum of Wakefield, Mass.), and the subsequent communication (after the connection is established) may use a different communication protocol, such as: Bluetooth® or Bluetooth Low Energy® (from the Bluetooth Special Interest Group of Kirkland, Wash.), an Institute of Electrical and Electronics Engineers (IEEE) 802.11 standard (which is sometimes referred to as Wi-Fi®), a cellular-telephone communication protocol (e.g., a 3G/4G network such as UMTS, LTE, etc.) and/or another communication protocol. (In the discussion that follows, near-field communication and Bluetooth are used as illustrative examples.) The convenience and security offered by this financial-transaction technique may improve the user experience, which may encourage more mobile financial transactions and, thus, may increase commercial activity.

The communication between the electronic device and the other electronic device is shown in FIG. 1, which presents a block diagram illustrating electronic devices 110 wirelessly communicating. In particular, these electronic devices may wirelessly communicate during a financial transaction. For example, the financial transaction may initiate when a user of electronic device 110-1 (such as a cellular telephone) may provide a transaction amount associated with the financial transaction to electronic device 110-1. For example, the user may enter the transaction amount via a user interface (such as a physical keyboard, a virtual keyboard displayed on a multi-touch screen, etc.). As described further below with reference to FIG. 2, a processor in electronic device 110-1 may forward the transaction amount to a secure element in electronic device 110-1.

After receiving the transaction amount, an activated payment applet (which is henceforth referred to as a 'merchant payment applet') executing in an environment of the secure element may generate, using an encryption key associated with the secure element (such as an encryption key associated with a provider of the secure element, a security domain in the secure element and/or the merchant payment applet), a signed blob based on the transaction amount, a merchant identifier (such as an identifier of electronic device 110-1) and, optionally, a transaction identifier (which may be predetermined or dynamically generated by the secure element and/or the merchant payment applet). For example, the signed blob may be encrypted using the encryption key and may be signed using a digital signature that is specific to electronic device 110-1 and/or components in electronic device 110-1 (such as the secure element). Note that a 'blob' may include a block or a group of data or information.

Then, a user of electronic device 110-2 (such as another cellular telephone) may activate a payment applet (which is henceforth referred to as a 'counterparty payment applet') in a secure element in electronic device 110-2. For example, the user of electronic device 110-2 may activate the counterparty payment applet via an application (e.g., a digital wallet, a passbook and/or a mobile payments application) executed in an environment (such as an operating system) of a processor in electronic device 110-2. (However, in some embodiments the counterparty payment applet is activated by electronic device 110-2 when electronic device 110-1 is proximate to electronic device 110-2.)

When a user of electronic device 110-2 (such as another cellular telephone) positions electronic device 110-2 proximate to electronic device 110-1, the merchant payment applet (or a radio controller and/or electronic device 110-2) may communicate connection information (such as encryption/decryption keys, passwords, identifiers, etc.) to electronic device 110-2 via radio 112-1 using near-field communication. (In order to ensure compatibility with legacy electronic devices, the near-field-communication controllers in radios 112 may operate in a reader mode.) In response, the counterparty payment applet may communicate additional connection information to electronic device 110-1 via radio 112-2 using near-field communication. (While 'connection information' and 'additional connection information' are described here, note that 'connection information' sometimes encompasses both the connection information and the additional connection information.) In order to ensure compatibility with electronic devices only supporting near-field communication in card emulation mode, the near-field-communication controllers in radios 112 may operate in a reader mode. However, both devices may operate in peer-to-peer mode. Note that proximity may involve physical contact between electronic devices 110 (such as touching or tapping electronic device 110-1 on electronic device 110-2) or may be contactless (e.g., electronic device 110-1 may be within the radiation pattern of an antenna in electronic device 110-2, such as within a few inches to a foot). As noted previously, this wireless communication may use a radio-frequency-identification communication protocol (such as near-field communication). Thus, the wireless communication may or may not involve a connection being established between electronic devices 110, and therefore may or may not involve communication via a wireless network (such as a cellular-telephone network).

Moreover, electronic devices 110 may, via radios 112, establish a connection between electronic devices 110 based on the connection information and the additional connection information. For example, electronic devices 110 may be paired based on Bluetooth connection information to establish a Bluetooth or a Bluetooth Low Energy connection or link. (Thus, touching or bringing electronic device 110-1 (FIG. 1) proximate to electronic device 110-2 (FIG. 1) may allow a direct connection via peer-to-peer wireless connection (with rich-data communication) to be established. While near-field communication may allow an encryption/decryption key to be exchanged between electronic devices 110 (FIG. 1), subsequent wireless communication between electronic devices 110 in FIG. 1 may be encrypted/decrypted.) Concurrently, the merchant payment applet may communicate the signed blob to electronic device 110-2 via radio 112-1 using near-field communication. Thus, the connection may be established in parallel with the communication of the signed blob. This approach may allow the user of electronic device 110-2 to conduct the financial transaction by bringing electronic device 110-2 into proximity with electronic device 110-1 once (a so-called 'one-tap transaction') and briefly (by extending and retracting their arm). The operations of establishing the connection and communicating the signed blob may be performed concurrently so that the overall transaction time is short. However, if the pairing occurs faster than often occurs in present technology (such as 1-10 s), then the connection may be established first, and then the signed blob may be communicated between electronic devices 110 via radios 112 using the connection. Similarly, if a Wi-Fi network exists in the environment of electronic devices 110, the connection information may include a service set identification and password, which may allow radio 112-2 to establish a Wi-Fi connection with radio 112-1, so that subsequent communication (including communicating the signed blob) may occur via Wi-Fi. Alternatively, if a connection already exists between electronic devices 110, then the operations involving near-field communication may be excluded from the financial-transaction technique, and the communication between electronic devices 110 may occur via radios 112 using the connection. In some embodiments, electronic devices 110 communicate via a cellular-telephone network and the operations involving near-field communication may be excluded from the financial-transaction technique.

After receiving the signed blob, the counterparty payment applet may create a signed transaction blob. The signed transaction blob may include the transaction amount, the merchant identifier, financial-account information and, optionally, the transaction identifier. For example, the financial-account information may be associated with the counterparty payment applet and may specify a financial account, such as a credit-card account (and, more generally, a financial vehicle associated with a financial account, such as a credit card or a debit card) that the user of electronic device 110-2 is using to provide payment for items or services being purchased during the financial transaction. In particular, the financial-account information may (in some instances) include a device primary account number (DPAN) instead of the financial primary account number (FPAN) or credit-card number, where the DPAN may be thought of as a 'virtual' credit card number that corresponds/maps to a 'real' FPAN. The financial-account information may correspond to or be equivalent to magnetic-stripe data on a credit card. As shown in Table 1, in some embodiments the financial-account information includes so-called 'track 1' data and/or 'track 2' data, such as: a token associated with a financial-account identifier, a cardholder-name field, an expiration date of the financial account specified by the financial-account identifier, a numerical value corresponding to a number of financial transactions conducted by electronic device 110-2, a dynamic card verification value (DCVV) for the financial transaction, and/or additional data.

TABLE 1

| Track | Financial-Account Information |
|---|---|
| 1 | DPAN\|Cardholder Name\|Expiration Date\|Counter + DCVV\|Additional Data |
| 2 | DPAN\|Expiration Date\|Counter + DCVV\|Additional Data |

Thus, the financial-account information may (in some instances) exclude explicit identifiers of the user of electronic device 110-2 to protect their privacy, and may dynamically or indirectly specify the financial account to prevent subsequent fraud or misuse of the financial-account information (such as if a malicious party intercepts the financial-account information during the wireless communication). In addition to using the DPAN, the cardholder-name field may include information specifying a provider or manufacturer of electronic device 110-2 (e.g., Apple Inc., of Cupertino, Calif.) and a placeholder for the user or the credit cardholder's name, such as 'APL/VALUED CUSTOMER.' (However, outside of the United States, the cardholder's name may not be included with the financial-account information.) Moreover, the financial-account information may include a truncated counter value (such as the least-significant three bits, four bits or five bits of a two-byte counter value) combined with the dynamic card verification value. The dynamic card verification value may be dynamically generated by the secure element in electronic device 110-2 for each financial transaction using a cryptographic technique using the DPAN, the counter value, one or more cryptographic keys and a random number provided by electronic device 110-1 during the wireless communication. Consequently, a different dynamic card verification value may be generated for each financial transaction.

Note that creating the signed transaction blob may or may not involve decrypting the signed blob (thus, electronic device 110-2 may or may not have access to a decryption key corresponding to the encryption key). Consequently, the signed transaction blob may include the signed blob or may include information associated with the signed blob that is extracted by the merchant payment applet and/or the secure element on electronic device 110-2. Furthermore, creating the signed transaction blob may involve encryption of at least a portion of the transaction blog using an encryption key associated with electronic device 110-2 (such as an encryption key associated with a provider of the secure element, a security domain in the secure element and/or the counterparty payment applet), and may be signed using a digital signature that is specific to electronic device 110-2 and/or components in electronic device 110-2 (such as the secure element). Note that, in general, the encryption key associated with electronic device 110-2 may (or may not) be different than the encryption key associated with electronic device 110-1.

Next, the counterparty payment applet may communicate the signed transaction blob to electronic device 110-1 via radio 112-2 using the connection. Furthermore, the merchant payment applet may communicate the signed transaction blob to a server 116 to conduct the financial transaction. (However, in embodiments where the communication occurs via a Wi-Fi connection or a cellular-telephone network, electronic device 110-2 may communicate the signed transaction blob to server 116.) Note that the communication with server 116 may occur via radio 112-1 and, more generally, via an interface circuit or a network interface circuit. Thus, the communication with the server may involve wireless communication, wired communication and/or optical communication, and may use the same and/or different communication protocols than those used between electronic devices 110. In general, the communication with server 116 may occur via a network 118, such as: the Internet, a wireless local area network, an Ethernet network, an intranet, an optical network, etc.

Server 116 may be associated with a third party that is other than users of electronic devices 110. For example, the third party may include a provider of electronic device 110-1 and/or electronic device 110-2. Alternatively, the third party may include a payment network 120.

After receiving the signed transaction blob, server 116 provides the information included in the signed transaction blob to payment network 120. (Alternatively, electronic device 110-1 may provide the signed transaction blob to payment network 120.) In response, payment network 120 and/or financial institution 122 (such as a bank, which may be an issuer of the credit card or financial vehicle being used to pay for the financial transaction) may process or complete the financial transaction using the information included in the signed transaction blob. For example, after successful verification of the financial account and the user of electronic device 110-2 (or counterparty), the financial account may be debited for the financial amount and electronic device 110-2 may be notified by payment network 120 and/or financial institution 122 that payment is approved. In particular, confirmation that the financial transaction was successfully completed may be communicated to electronic device 110-1 via network 118. Then, the merchant payment applet in electronic device 110-1 may communicate the confirmation to the counterparty payment applet in electronic device 110-2 via radios 112 using the connection. (Alternatively, if a Wi-Fi connection or a cellular-telephone network is available, payment network 120 and/or financial institution 122 may communicate the confirmation to electronic device 110-2.) The application executed by the processor on electronic device 110-2 may display the confirmation on a display so that the user of electronic device 110-2 is alerted. In some embodiments, the confirmation may include digital-receipt information, such as: a status of the financial transaction (e.g., the financial transaction is complete), the merchant identifier, the financial amount of the financial transaction, an itemized list of one or more purchased items, links (such as URLs) to information associated with products, advertising, discounts (such as coupons) for future purchases of at least one item, discounts for future purchases from the merchant in the financial transaction, accounting information (which can be used to account for expenses, such as an expense report), and sales-tax and/or income-tax information (which can be used to determine an income-tax return).

Note that server 116, payment network 120 and/or financial institution 122 may have access to the decryption key(s) needed to decrypt and extract the information from the signed transaction blob. While we refer to entities such as 'payment network 120,' and 'financial institution 122,' this is done for ease of description. What is meant by payment network 120, etc., is hardware (server computers and related networking equipment) under the control of and/or otherwise performing actions on behalf of such entities.

In order to enhance security of the financial transaction, prior to providing the signed blob to electronic device 110-2, the merchant payment applet may provide the signed blob to server 116, and may receive a confirmation from server 116 that electronic device 110-1 is authorized to conduct the financial transaction. For example, server 116 may determine if electronic device 110-1 is currently authorized to conduct the financial transaction based on the merchant identifier. Alternatively or additionally, as described further below with reference to FIG. 2, prior to receiving the transaction amount an authentication application executed by a secure enclave processor in the processor on electronic device 110-1 may: receive authentication information associated with the user of electronic device 110-1; and authenticate the user based on the authentication information and stored authentication information on electronic device 110-

1. Similarly, as described further below with reference to FIG. 2, prior to activating the counterparty payment applet an authentication application executed by a secure enclave processor in the processor on electronic device 110-2 may: receive authentication information associated with the user of electronic device 110-2; and authenticate the user based on the authentication information and stored authentication information on electronic device 110-2.

Furthermore, after receiving the signed blob and prior to creating the signed transaction blob, the counterparty payment applet may decrypt the signed blob using a decryption key corresponding to the encryption key used to generate the signed blob (thus, in some embodiments electronic device 110-2 has access to this decryption key), and may forward a request to the application executed by the processor on electronic device 110-2. This request may be displayed on electronic device 110-2. In particular, the request may include the financial-transaction amount, and may request authorization from the user to conduct the financial transaction. In response, the user may provide the authorization, e.g., by activating a physical button or a virtual icon displayed on a multi-touch screen. After receiving the user's authorization, the counterparty payment applet may create the signed transaction blob and may perform the subsequent operations in the financial-transaction technique.

The wireless communication between electronic devices 110 may involve the exchange of packets that include the signed blob and the signed transaction blob. These packets may be included in frames in one or more wireless channels.

Figure 2:
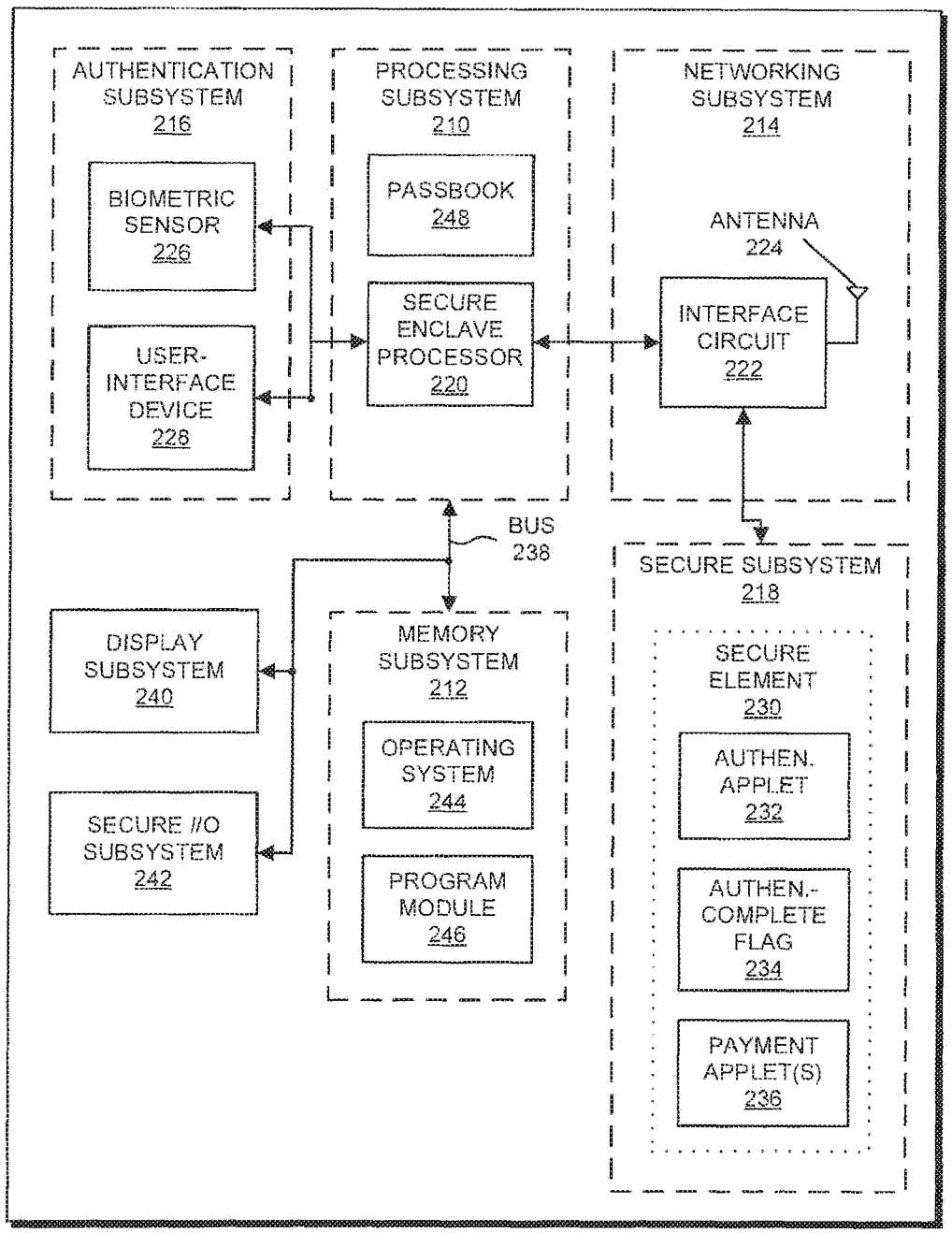
FIG. 2 is a block diagram illustrating one of the electronic devices of FIG. 1 in accordance with an embodiment of the present disclosure.

As described further below with reference to FIG. 2, electronic devices 110 may include subsystems, such as: a networking subsystem, a memory subsystem, a processing subsystem and a secure subsystem. In addition, electronic devices 110 may include radios 112 in the networking subsystems. More generally, electronic devices 110 can include (or can be included within) any electronic devices with networking subsystems that enable electronic devices 110 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IP SEC), transmitting and receiving packets or frames, etc.

As can be seen in FIG. 1, wireless signals 114 (represented by a jagged line) are transmitted from a radio 112-1 in electronic device 110-1. These wireless signals 114 are received by radio 112-2 in electronic device 110-2. In the described embodiments, processing a packet or frame in either of electronic devices 110 includes: receiving wireless signals 114 with the packet or frame; decoding/extracting the packet or frame from received wireless signals 114 to acquire the packet or frame; and processing the packet or frame to determine information contained in the packet or frame (such as the signed blob or the signed transaction blob).

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the electronic device. FIG. 2 presents a block diagram illustrating electronic device 200, which may be electronic device 110-1 or 110-2 in FIG. 1. This electronic device includes processing subsystem 210, memory subsystem 212, networking subsystem 214, authentication subsystem 216 and secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220 (which is a system-on-chip within one or more processors in processing subsystem 210) that performs security services for other components in the processing subsystem 210 and that securely communicates with other subsystems in electronic device 200. Secure enclave processor 220 may include one or more processors, a secure boot ROM, one or more security peripherals, and/or other components. The security peripherals may be hardware-configured to assist in the secure services performed by secure enclave processor 220. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a carefully controlled interface, thus forming a secure enclave for secure enclave processor 220 and its components. Because the interface to secure enclave processor 220 is carefully controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with stored authentication and, if a match is obtained, may provide an encrypted token with an authentication-complete indicator to a secure element 230.

Memory subsystem 212 includes one or more devices for storing data and/or instructions for processing subsystem 210, networking subsystem 214, authentication subsystem 216 and/or secure subsystem 218. For example, memory subsystem 212 can include dynamic random-access memory (DRAM), static random-access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and at least an antenna 224 (thus, there may be one or more antennas in electronic device 200). For example, networking subsystem 214 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 200 may use the mechanisms in networking subsystem 214 for performing simple wireless communication between electronic devices 110 (FIG. 1), e.g., transmitting advertising frames and/or near-field communication as described previously.

Authentication subsystem 216 may include one or more processors, controllers and devices for receiving the authentication information from a user of electronic device 200, and for securely communicating this authentication information to processing subsystem 210 (such as by encrypting the authentication information). For example, the authentication information may include: a biometric identifier acquired by a biometric sensor 226 (such as: a fingerprint sensor, a retinal sensor, a palm sensor, a signature-identification sensor, etc.); a personal identification number (PIN) associated with one of payment applets 236 that is received using a user-interface device 228 (such as a keypad, a touch-sensitive display, optical character recognition and/or voice recognition); and a passcode for unlocking at least some functionality of electronic device 200 that is received using user-interface device 228.

Furthermore, secure subsystem 218 may include a secure element 230, which includes one or more processors and memory. Note that secure element 230 may be a tamper-resistant component that is used in electronic device 200 to provide the security, confidentiality, and multiple application environments required to support various business models. Secure element 230 may exist in one or more of a variety of form factors, such as: a universal integrated circuit card (U/CC), an embedded secure element (on a circuit board in electronic device 200), a smart secure digital (SD) card, a smart microSD card, etc.

Moreover, secure element 230 may include one or more applets or applications that execute in an environment of secure element 230 (such as in the operating system of secure element 230, and/or in a Java runtime environment executing on the secure element 230). For example, the one or more applets may include an authentication applet 232 that: performs contactless registry services, encrypts/decrypts packets or tokens communicated with secure enclave processor 220, sets one or more software flags (such as an authentication-complete flag 234) in an operating system of secure element 230, and/or conveys information to one or more payment applets 236 via sharable interface objects. (While a sharable interface object is used as an illustrative example in the present discussion, in other embodiments different mechanisms may be used, such as global services, remote method invocation (RMI), etc.) In addition, the one or more applets may include one or more payment applets 236 that conduct financial transactions when they are activated by program module 246, and based on the one or more software flags and/or when electronic device 110-1 is proximate to electronic device 110-2 (FIG. 1).

Authentication applet 232 may execute in a master or issuer security domain in secure element 230, while payment applets 236 may execute in supplemental security domains. Communication between these security domains may be encrypted using different encryption/decryption keys that are security-domain specific. In electronic device 200 and/or during communication between electronic devices 110 (FIG. 1), encryption/decryption may involve symmetric and/or asymmetric encryption. In addition, the information communicated may also include a digital signature that is specific to electronic device 200 and/or components in electronic device 200.

Figure 3:
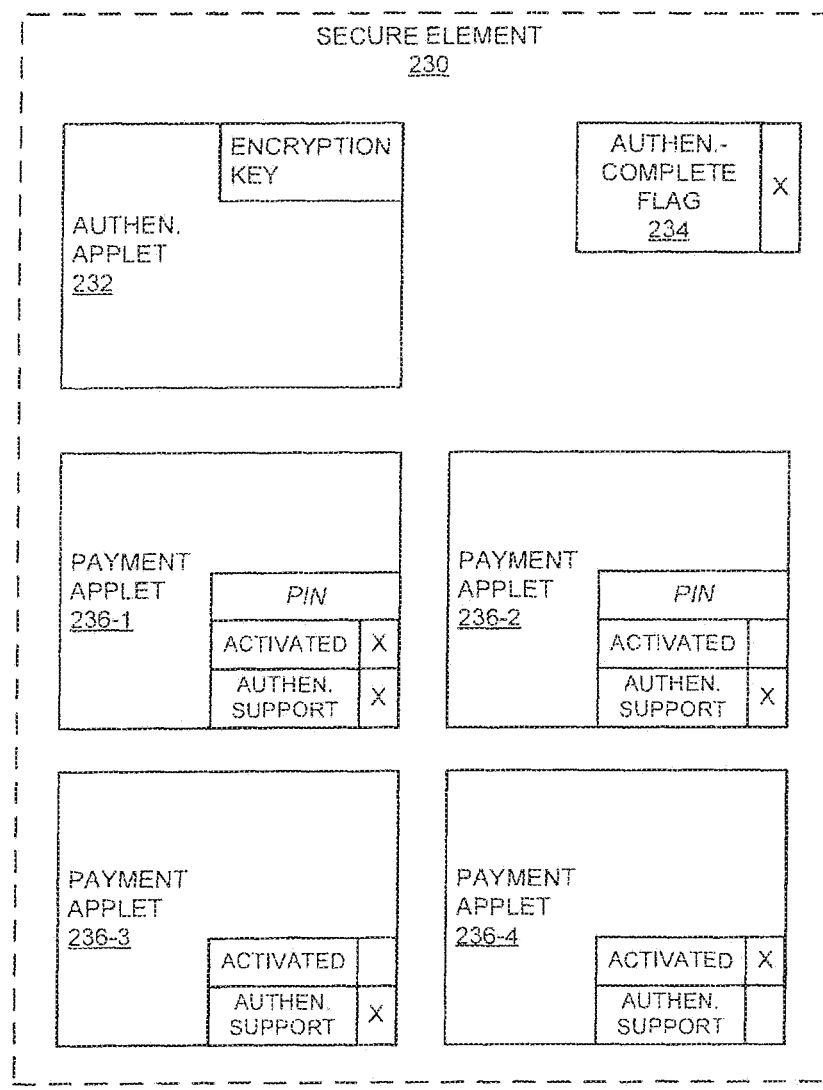
FIG. 3 is a block diagram illustrating the secure element in the electronic device in FIG. 2 in accordance with an embodiment of the present disclosure.

The data stored in secure element 230 is further illustrated in FIG. 3. In particular, for each of payment applets 236, secure element 230 may store: whether a given payment applet is active (in response to an activation command); and whether or not authentication-complete flag 234 is supported by/applies to the given payment applet. In some embodiments there are one or more payment applets (such as payment applet 236-4) for which authentication-complete flag 234 does not apply. In some embodiments, secure element 230 stores, for at least one of payment applets 236, a PIN (such as a debit-card number) that is associated with this payment applet. For example, as shown in FIG. 3, payment applets 236-1 and 236-2 may store associated PINs. Additionally, one or more of the payment applets may store associated financial-account information.

In embodiments where electronic device 200 performs the functions of electronic device 110-1 in FIG. 1, the user may use passbook 248 to select or activate the merchant payment applet, which is one of payment applets 236. Moreover, passbook 248 may display a request for the transaction amount on display subsystem 240. In response, the user may enter the transaction amount using user-interface device 228 (such as a physical keyboard, a virtual keyboard displayed on a multi-touch screen, etc.). Passbook 248 may forward the transaction amount to the merchant payment applet on secure element 230 via secure enclave processor 220 and networking subsystem 214. Then, the merchant payment applet generates the signed blob based on the transaction amount, the merchant identifier and, optionally, the transaction identifier using the encryption key and the digital signature.

When electronic device 110-2 (FIG. 1) is proximate to electronic device 200 (e.g., based on a received signal strength), interface circuit 222 may notify the merchant payment applet. In response, the merchant payment applet may, via interface circuit 222 and antenna 224, transmit the connection information to electronic device 110-2 (FIG. 1) using near-field communication. In addition, interface circuit 222 and antenna 224 may receive the additional connection information for electronic device 110-2 (FIG. 1).

In response, the merchant payment applet may instruct interface circuit 222 to establish the connection with electronic device 110-2 (FIG. 1) based on the additional connection information. Concurrently, the merchant payment applet communicates, via interface circuit 222 and antenna 224, the signed blob to electronic device 110-2 using near-field communication.

When interface circuit 222 and antenna 224 receive the signed transaction blob via the connection, the merchant payment applet may instruct interface circuit 222 to provide the signed transaction blob to server 116 (FIG. 1) and/or payment network 120 (FIG. 1) to conduct the financial transaction. Subsequently, interface circuit 222 and antenna 224 may receive the confirmation, which is provided to the merchant payment applet.

Next, the merchant payment applet may instruct interface circuit 222 to communicate the confirmation to electronic device 110-2 (FIG. 1) using the connection. In addition, the merchant payment applet may provide the confirmation to passbook 248 via networking subsystem 214 and secure enclave processor 220. Passbook 248 may display the confirmation on display subsystem 240, thereby alerting the user of electronic device 200 that the financial transaction is complete.

As noted previously, in order to enhance security of the financial transaction, prior to providing the signed blob to electronic device 110-2 (FIG. 1), the merchant payment applet may, via interface circuit 222 and antenna 224, provide the signed blob to server 116 (FIG. 1). Subsequently, interface circuit 222 may receive the confirmation from server 116 (FIG. 1) that electronic device 200 is authorized to conduct the financial transaction. This confirmation may be provided to the merchant payment applet. Alternatively or additionally, prior to receiving the transaction amount, the authentication application executed by secure enclave processor 220 (or passbook 248) may: receive the authentication information associated with the user of electronic device 200 from authentication subsystem 216; and authenticate the user based on the authentication information and stored authentication information on electronic device 110-1 (FIG. 1). Then, the authentication application may instruct authentication applet 232 to set or enable authentication-complete flag 234. In particular, if the merchant payment applet supports authentication-complete flag 234 (as indicated by the enabling or setting of authentication support in the merchant payment applet), in order for the merchant payment applet to conduct a financial transaction with electronic device 110-2 (FIG. 1), the merchant payment applet may need to be activated and authentication-complete flag 234 may need to be set or enabled in secure element 230 (indicating that the user has been authenticated). While the present discussion illustrates the use of a global authentication-complete flag 234, note that in some embodiments there are separate authentication-complete flags associated with at least some of the payment applets 236.

In embodiments where electronic device 200 performs the functions of electronic device 110-2 in FIG. 1, the user may use passbook 248 to select or activate the counterparty payment applet, which is one of payment applets 236. Subsequently, the user may position electronic device 200 proximate to electronic device 110-1 (FIG. 1). After receiving the connection information, interface circuit 222 and antenna 224 may transmit the additional connection information to electronic device 110-1 (FIG. 1) using near-field communication.

While establishing the connection using the connection information, interface circuit 222 may receive the signed blob using near-field communication. This signed blob may be provided to the counterparty payment applet. In response, the counterparty payment applet may create the signed transaction blob based on the signed blob and the financial-account information associated with the counterparty payment applet using another encryption key (which may or may not be different than the encryption key used by electronic device 110-1 in FIG. 1) and another digital signature.

Next, the counterparty payment applet may, via interface circuit 222 and antenna 224, communicate the signed transaction blob to electronic device 110-1 (FIG. 1) using the connection. Furthermore, interface circuit 222 may receive the confirmation that the financial transaction is complete from electronic device 110-1 (FIG. 1) using the connection. The counterparty payment applet may provide the confirmation to passbook 248 via networking subsystem 214 and secure enclave processor 220. Passbook 248 may display the confirmation on display subsystem 240, thereby alerting the user of electronic device 200 that the financial transaction is complete.

As noted previously, in order to enhance security of the financial transaction, prior to activating the counterparty payment applet an authentication application executed by secure enclave processor 220 (or passbook 248) may: receive authentication information associated with the user of electronic device 200; and authenticate the user based on the authentication information and stored authentication information on electronic device 200. Furthermore, after receiving the signed blob and prior to creating the signed transaction blob, the counterparty payment applet may decrypt the signed blob using a decryption key corresponding to the encryption key used by electronic device 110-1 (FIG. 1) to generate the signed blob, and may forward the request, via networking subsystem 214 and secure enclave processor 220, to passbook 248. This request, with the financial-transaction amount, may be displayed on display subsystem 240 and may request authorization from the user to conduct the financial transaction. In response, the user may provide the authorization using user-interface device 228, e.g., by activating a physical button or a virtual icon displayed on a multi-touch screen. Passbook 248 may provide the authorization to the counterparty payment applet, which then creates the signed transaction blob and performs the subsequent operations in the financial-transaction technique.

Within electronic device 200, processing subsystem 210, memory subsystem 212, networking subsystem 214, authentication subsystem 216 and secure subsystem 218 may be coupled together using one or more interconnects, such as bus 238. These interconnects may include an electrical, optical, and/or electro-optical connection that the subsystems can use to communicate commands and data among one another. Note that different embodiments can include a different number or configuration of electrical, optical, and/ or electro-optical connections among the subsystems. In some embodiments, electronic device 200 can detect tampering with secure components (such as secure enclave processor 220, secure element 230 and/or bus 238) and may destroy encryption/decryption keys or authentication information (such as a stored biometric identifier) if tampering is detected.

In some embodiments, the electronic device includes a display subsystem 240 for displaying information on a display, which may include a display driver and the display, such as a liquid-crystal display, a multi-touch touchscreen, etc. In addition, in some embodiments the electronic device includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216.

Electronic device 200 can be (or can be included in) any electronic device with at least one network interface. For example, electronic device 200 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 200, in alternative embodiments, different components and/or subsystems may be present in electronic device 200. For example, electronic device 200 may include one or more additional processing subsystems, memory subsystems, networking subsystems, authentication subsystems, secure subsystems, display subsystems and/or secure I/O subsystems. Additionally, one or more of the subsystems may not be present in electronic device 200. Moreover, in some embodiments, electronic device 200 may include one or more additional subsystems that are not shown in FIG. 2. For example, electronic device 200 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 200. For example, in some embodiments program module 246 is included in operating system 244. Alternatively or additionally, at least some of the functionality of program module 246 may be included in passbook 248.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 200. Moreover, the integrated circuit may include hardware and/or software mechanisms that are used for transmitting and receiving wireless signals. Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While communication protocols compatible with a near-field communication standard or specification and Bluetooth were used as an illustrative example, the described embodiments of the financial-transaction techniques may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Additionally, while the preceding discussion focused on the hardware, software and functionality in electronic device 200, server 116 (FIG. 1), and/or payment network 120 (FIG. 1) may have the same or similar hardware (processors, memory, networking interfaces, etc.) and/or software to support the operations performed by these entities, as described further below with reference to FIGS. 4-7. In particular, these entities may include one or more computer systems with a processing subsystem that executes one or more program modules stored in a memory subsystem to perform the operations, and one or more networking interfaces for communicating with other electronic devices, such as electronic device 200.

Figure 4:
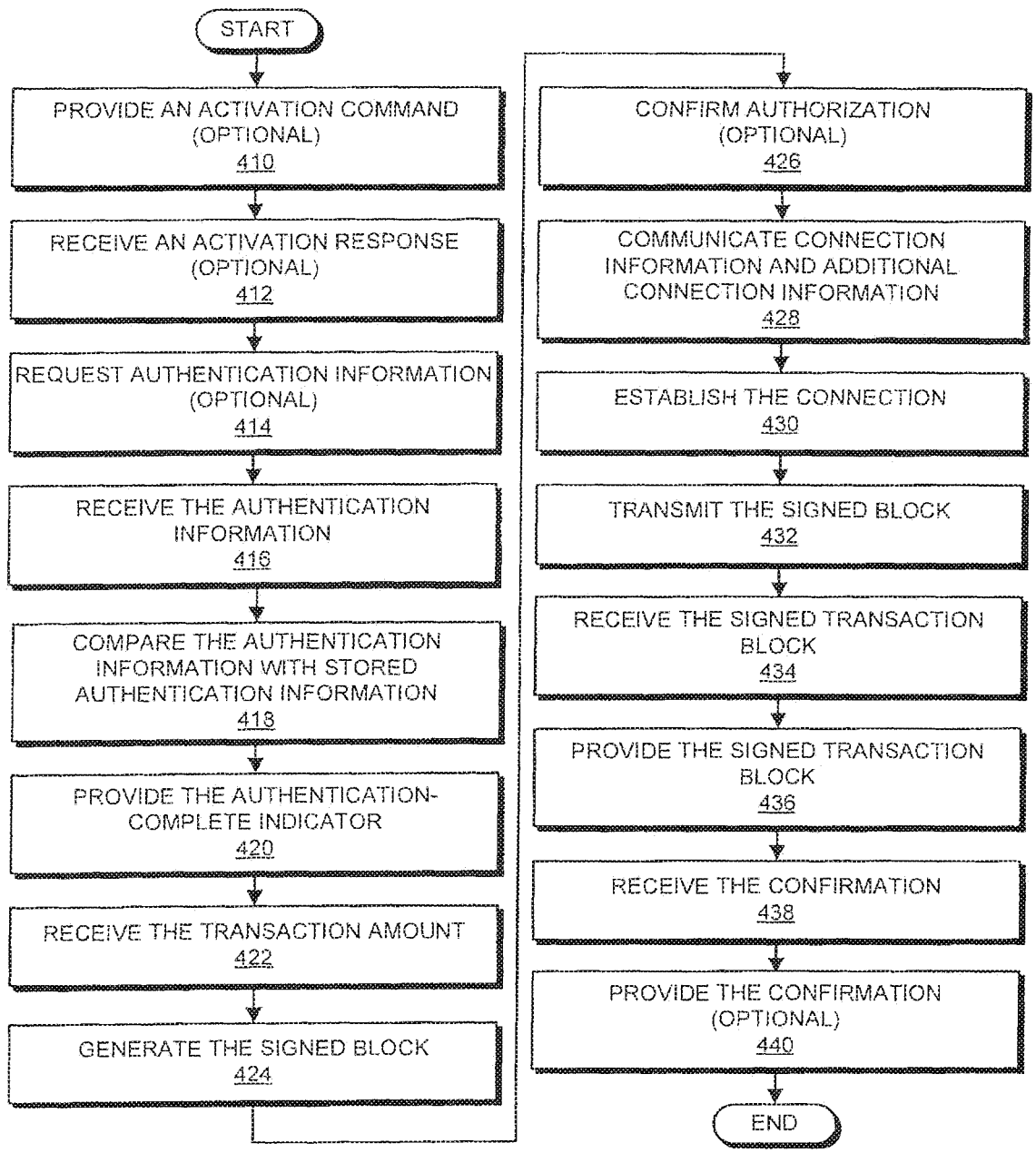
FIG. 4 is a flow diagram illustrating a method for conducting a financial transaction using one of the electronic devices in FIG. 1 in accordance with an embodiment of the present disclosure.

We now describe embodiments of the financial-transaction technique. FIG. 4 presents a flow diagram illustrating a method 400 for conducting a financial transaction, which may be performed by an electronic device (such as electronic device 110-1 in FIG. 1). During operation, a processor in the electronic device may optionally provide an activation command (operation 410) to a merchant payment applet (such as one of payment applets 236 in FIG. 2) via a secure enclave processor (such as secure enclave processor 220 in FIG. 2) and/or an interface circuit (such as interface circuit 222 in FIG. 2), where the payment applet may conduct the financial transaction after receiving the activation command and based on an authentication-complete indicator. For example, a user of the electronic device may use a digital wallet/passbook application (such as passbook 248 in FIG. 2) to select one of the payment applets corresponding to a credit or a debit card which will be used by the counterparty (i.e., the user of electronic device 110-2 in FIG. 1) to pay for the financial transaction, which may result in the activation command being provided to the selected merchant payment applet. This selection may be made by activating an icon displayed on a touch-sensitive display. Alternatively or additionally, the selection may be made using a top-level button in a user interface of the electronic device. For example, the user may perform a swiping gesture in a top-level user interface in a user-interface hierarchy or tree, and then may select the merchant payment applet from a set of possible payment applets that are displayed.

In response to the activation command, the processor may optionally receive an activation response (operation 412) from the merchant payment applet via the interface circuit and/or the secure enclave processor.

Then, the processor may optionally request authentication information (operation 414) based on the activation response. For example, the processor may request that a biometric sensor (such as biometric sensor 226 in FIG. 2) acquire a biometric identifier (such as a fingerprint) of the user.

In response to the request, the processor may receive the authentication information (operation 416). For example, the authentication information may include the biometric identifier, which is received from the biometric sensor.

Next, the processor may compare the authentication information with stored authentication information (operation 418) using the secure enclave processor. Note that stored authentication information may be stored in the processor or the secure enclave processor. In some embodiments, a PIN associated with the merchant payment applet is stored with the merchant payment applet in the secure element (e.g., there may be a pointer to a data structure in the operating system of the secure element). However, in some other embodiments, the PIN is stored in the processor after the user provides it the first time to the electronic device.

Moreover, the processor may provide the authentication-complete indicator (operation 420) to a secure element (such as secure element 230 in FIG. 2) via the secure enclave processor and/or the interface circuit if a match is obtained between the authentication information and the stored authentication information. This communication may involve secure (encrypted) communication between the secure enclave processor and the secure element.

If the merchant payment applet supports authentication (which may be set during installation of the merchant payment applet in the secure element), the authentication-complete indicator may enable the activated merchant payment applet to conduct the financial transaction. For example, an authentication applet (such as authentication applet 232 in FIG. 2) in the secure element may set an authentication-complete flag in an operating system of the secure element to 'true' to enable the activated merchant payment applet if the authentication-complete indicator indicates that a match was obtained with the stored authentication information; otherwise, the authentication-complete flag may be set to 'false' to disable the activated merchant payment applet. Note that in some embodiments the authentication-complete flag is stored in random-access memory in the secure element. (Storing the authentication-complete flag in random-access memory may, in some instances, save power, and may also have the effect of clearing the authentication-complete flag when the electronic device is powered off) Furthermore, as noted previously, the authentication applet may decrypt an encrypted token received from the secure enclave processor using an encryption key, and the token may include the authentication-complete indicator.

After the merchant payment applet is activated and the authentication-complete flag is set based on the authentication-complete indicator, the electronic device may conduct the financial transaction. In particular, the merchant payment applet may receive the transaction amount (operation 422) associated with the financial transaction from the user. For example, in response to a request displayed by the digital wallet/passbook application, the user may enter or provide the transaction amount using a user-interface device (such as user-interface device 228 in FIG. 2), which is provided to the secure element via the secure enclave processor and/or the interface circuit. Then, the merchant payment applet may generate the signed blob (operation 424) based on the transaction amount, the merchant identifier and, optionally, the transaction identifier using the encryption key and the digital signature.

In some embodiments, the electronic device optionally confirms authorization (operation 426). In particular, the merchant payment applet may, via the interface circuit, provide the signed blob to a server (such as server 116 in FIG. 1), and subsequently receives a confirmation from the server that the electronic device is authorized to conduct the financial transaction. (If the confirmation is not received, method 400 may terminate.)

When the electronic device is proximate to electronic device 110-2 (FIG. 1), the interface circuit communicates the connection information and the additional connection information (operation 428) using near-field communication. Next, the merchant payment applet may establish the connection (operation 430) with electronic device 110-2 (FIG. 1) based on the additional connection information using the interface circuit. Concurrently, the merchant payment applet may transmit the signed blob (operation 432) with electronic device 110-2 (FIG. 1) via the interface circuit using near-field communication.

After receiving the signed transaction blob (operation 434) from electronic device 110-2 (FIG. 1) via the interface circuit using the connection, the merchant payment applet may provide, via the interface circuit, the signed transaction blob (operation 436) to the server and/or a payment network (such as payment network 120 in FIG. 1) to conduct the financial transaction.

Subsequently, the merchant payment applet may receive, via the interface circuit using the connection, the confirmation (operation 438) that the financial transaction is complete (and, more generally, the financial-transaction status). In some embodiments, the merchant payment applet optionally provides, via the interface circuit, the confirmation (operation 440) to electronic device 110-2 (FIG. 1).

Figure 5:
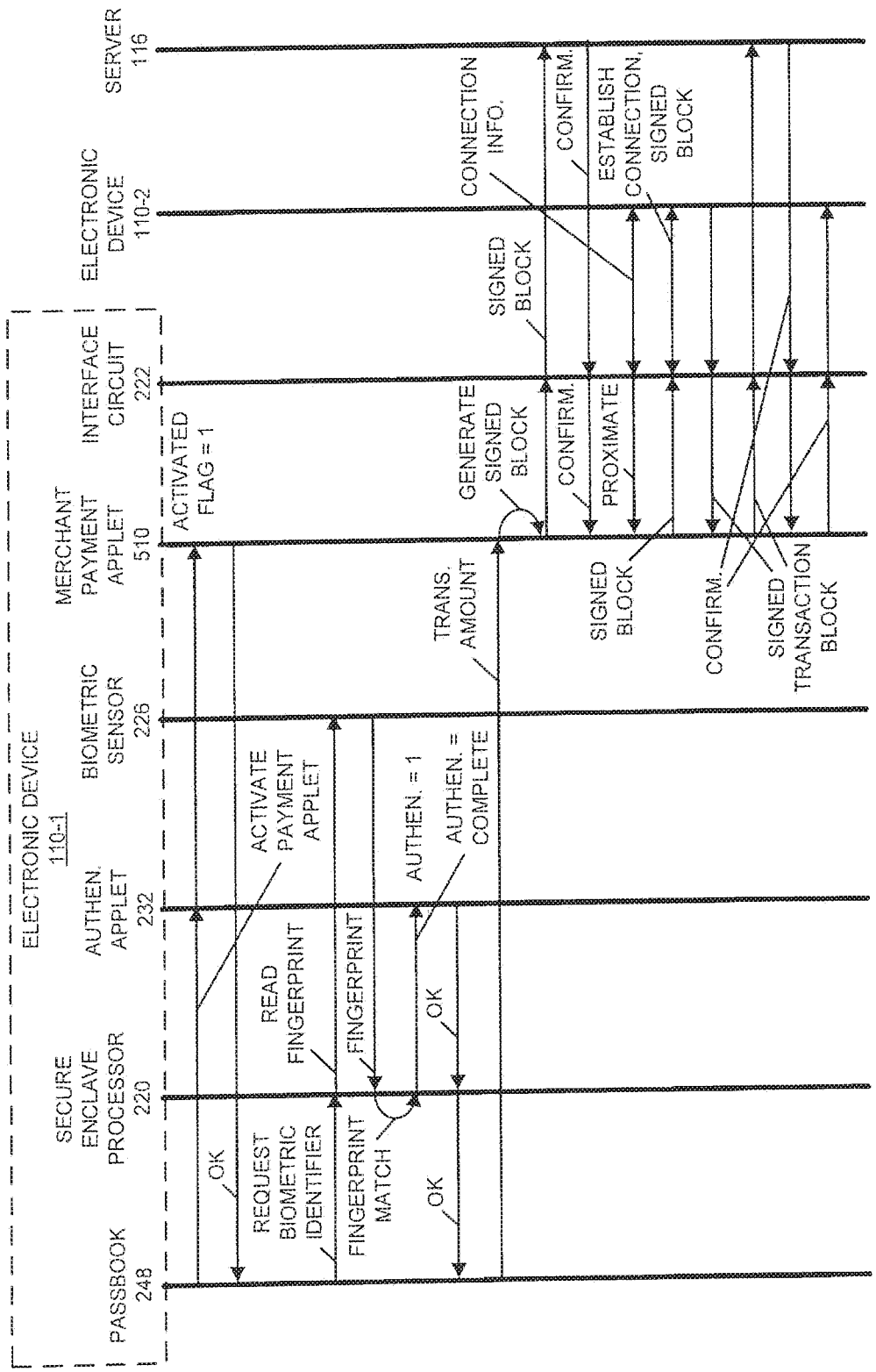
FIG. 5 is a drawing illustrating communication between the electronic devices of FIG. 1 in accordance with an embodiment of the present disclosure.

We now describe FIG. 5, which presents a drawing illustrating communication within electronic device 110-1 (FIG. 1) and between electronic devices 110-1 and 110-2 (FIG. 1), and which provides further information regarding the aforementioned financial-transaction technique of FIG. 4. In particular, passbook 248 may provide an activation command to authentication applet 232 for one of payment applets 236 in FIG. 2 (such as the merchant payment applet 510). In response to the activation command, passbook 248 may receive the activation response from merchant payment applet 510.

Next, passbook 248 may request biometric authentication, such as a biometric identifier. In response, secure enclave processor 220 may request biometric sensor 226 to acquire a fingerprint of the user. Biometric sensor 226 may provide the fingerprint in response to this request. If secure enclave processor 220 obtains a match with stored authentication information (such as a stored fingerprint of the user), secure enclave processor 220 may communicate the authentication-complete indicator to authentication applet 232, which may set the authentication-complete flag. Moreover, authentication applet 232 may indicate that merchant payment applet 510 is ready for use to secure enclave processor 220, which in turn may notify passbook 248.

Furthermore, merchant payment applet 510 may receive the transaction amount associated with the financial transaction from the user. For example, in response to a request displayed by passbook 248, the user may provide or enter the transaction amount using a user-interface device. Then, merchant payment applet 510 may generate the signed blob based on the transaction amount, the merchant identifier and, optionally, the transaction identifier using the encryption key and the digital signature.

In some embodiments, merchant payment applet provides the signed blob to server 116 via interface circuit 222, and subsequently receives a confirmation from server 116 that electronic device 110-1 is authorized to conduct the financial transaction.

Subsequently, when electronic device 110-1 is proximate to electronic device 110-2, interface circuit 222 indicates that electronic device 110-2 is proximate to merchant payment applet 510, and communicates or exchanges the connection information and the additional connection information (which is indicated by 'connection info.' in FIG. 5) using near-field communication. Next, merchant payment applet 510 (via interface circuit 222) may establish the connection with electronic device 110-2 based on the connection information and the additional connection information. Concurrently, merchant payment applet 510 may communicate the signed blob to electronic device 110-2 via interface circuit 222 using near-field communication.

After receiving the signed transaction blob from electronic device 110-2 via interface circuit 222 using the connection, merchant payment applet 510 may provide, via interface circuit 222, the signed transaction blob to server 116 to conduct the financial transaction.

Furthermore, merchant payment applet 510 may receive, via interface circuit 222, the confirmation that the financial transaction is complete. In some embodiments, merchant payment applet 510 optionally provides, via interface circuit 222, the confirmation to electronic device 110-2.

Note that the operations illustrated in FIG. 5 may include challenge and response operations, which are not shown for clarity.

Figure 6:
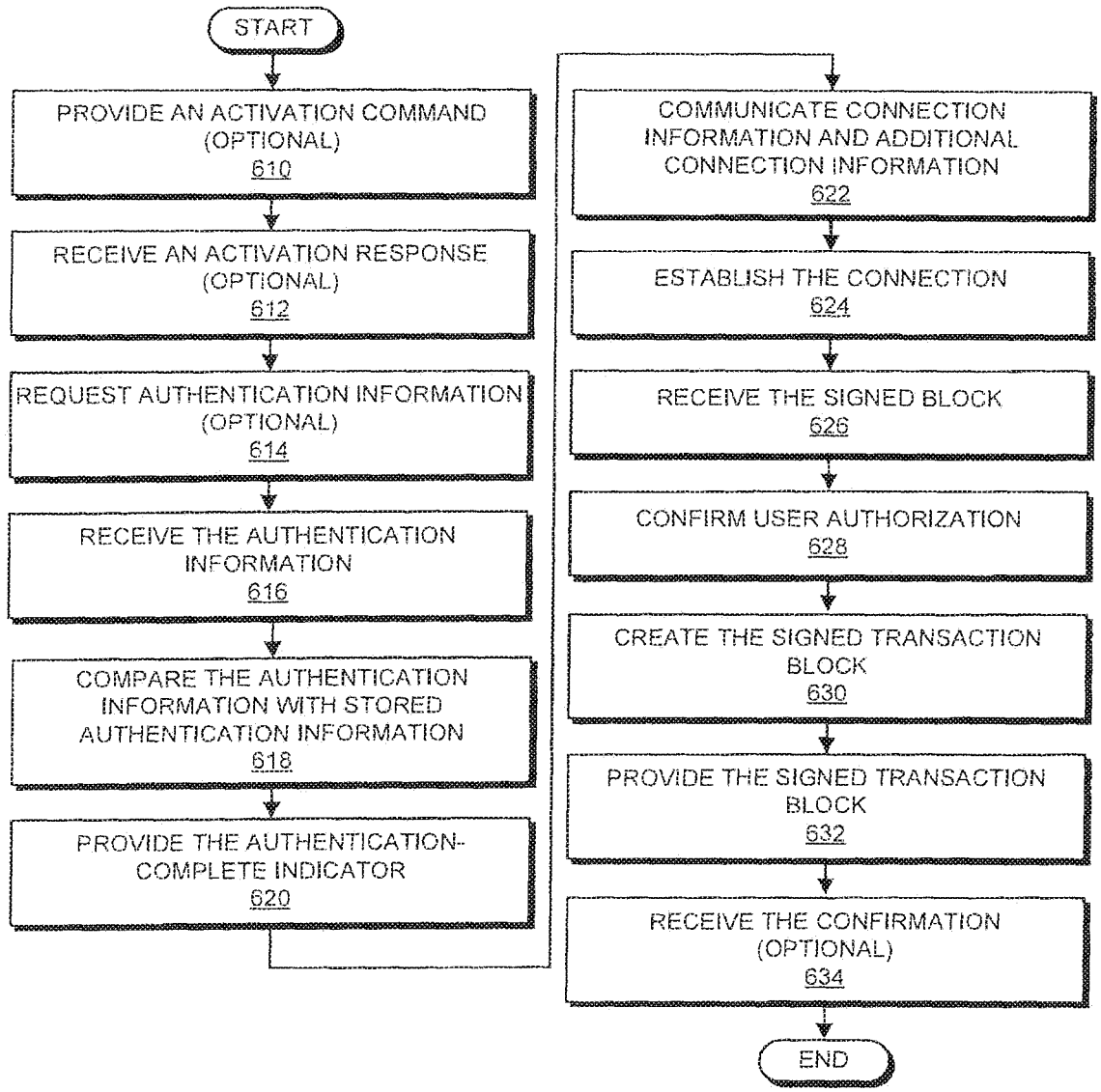
FIG. 6 is a flow diagram illustrating a method for conducting a financial transaction using one of the electronic devices in FIG. 1 in accordance with an embodiment of the present disclosure.

FIG. 6 presents a flow diagram illustrating a method 600 for conducting a financial transaction, which may be performed by an electronic device (such as electronic device 110-2 in FIG. 1). During operation, a processor in the electronic device may optionally provide an activation command (operation 610) to a counterparty payment applet (such as one of payment applets 236 in FIG. 2) via a secure enclave processor (such as secure enclave processor 220 in FIG. 2) and/or an interface circuit (such as interface circuit 222 in FIG. 2), where the counterparty payment applet may conduct the financial transaction after receiving the activation command and based on an authentication-complete indicator. For example, a user of the electronic device may use a digital wallet/passbook application (such as passbook 248 in FIG. 2) to select one of the payment applets corresponding to a credit or a debit card which will be used by the user of electronic device 110-2 (FIG. 1) to pay for the financial transaction, which may result in the activation command being provided to the selected counterparty payment applet. This selection may be made by activating an icon displayed on a touch-sensitive display. Alternatively or additionally, the selection may be made using a top-level button in a user interface of the electronic device. For example, the user may perform a swiping gesture in a top-level user interface in a user-interface hierarchy or tree, and then may select the counterparty payment applet from a set of possible payment applets that are displayed.

In response to the activation command, the processor may optionally receive an activation response (operation 612) from the counterparty payment applet via the interface circuit and/or the secure enclave processor.

Then, the processor may optionally request authentication information (operation 614) based on the activation response. For example, the processor may request that a biometric sensor (such as biometric sensor 226 in FIG. 2) acquire a biometric identifier (such as a fingerprint) of the user.

In response to the request, the processor may receive the authentication information (operation 616). For example, the authentication information may include the biometric identifier, which is received from the biometric sensor.

Next, the processor may compare the authentication information with stored authentication information (operation 618) using the secure enclave processor. Note that stored authentication information may be stored in the processor or the secure enclave processor. In some embodiments, a PIN associated with the counterparty payment applet is stored with the counterparty payment applet in the secure element (e.g., there may be a pointer to a data structure in the operating system of the secure element). However, in some other embodiments, the PIN is stored in the processor after the user provides it the first time to the electronic device.

Moreover, the processor may provide the authentication-complete indicator (operation 620) to a secure element (such as secure element 230 in FIG. 2) via the secure enclave processor and/or the interface circuit if a match is obtained between the authentication information and the stored authentication information. This communication may involve secure (encrypted) communication between the secure enclave processor and the secure element.

If the counterparty payment applet supports authentication (which may be set during installation of the counterparty payment applet in the secure element), the authentication-complete indicator may enable the activated counterparty payment applet to conduct the financial transaction. For example, an authentication applet (such as authentication applet 232 in FIG. 2) in the secure element may set an authentication-complete flag in an operating system of the secure element to 'true' to enable the activated counterparty payment applet if the authentication-complete indicator indicates that a match was obtained with the stored authentication information; otherwise, the authentication-complete flag may be set to 'false' to disable the activated counterparty payment applet. Note that in some embodiments the authentication-complete flag is stored in random-access memory in the secure element. (Storing the authentication-complete flag in random-access memory may, in some instances, save power, and may also have the effect of clearing the authentication-complete flag when the electronic device is powered off.) Furthermore, as noted previously, the authentication applet may decrypt an encrypted token received from the secure enclave processor using an encryption key, and the token may include the authentication-complete indicator.

After the counterparty payment applet is activated and the authentication-complete flag is set based on the authentication-complete indicator, the electronic device may conduct the financial transaction. In particular, when the electronic device is proximate to electronic device 110-1 (FIG. 1), the interface circuit communicates the connection information and the additional connection information (operation 622) using near-field communication. Next, the counterparty payment applet may establish the connection (operation 624) with electronic device 110-1 (FIG. 1) based on the additional connection information using the interface circuit. Concurrently, the counterparty payment applet may receive the signed blob (operation 626) from electronic device 110-1 (FIG. 1) via the interface circuit using near-field communication.

In some embodiments, the counterparty payment applet optionally confirms user authorization (operation 628). For example, the counterparty payment applet may decrypt the signed blob using the decryption key corresponding to the encryption key, and may forward a request (with the transaction amount) for authorization to the processor via the interface circuit and/or the secure enclave processor. Passbook 248 (FIG. 2) executed by the processor may display the request and may receive the user response with the authorization. In particular, the user may use a user-interface device (such as user-interface device 228 in FIG. 2) to provide the authorization. Then, passbook 248 may provide the authorization to the counterparty payment applet via the secure enclave processor and/or the interface circuit.

Furthermore, the counterparty payment applet may create the signed transaction blob (operation 630) based on the signed blob and the financial-account information associated with the counterparty payment applet using another encryption key (which may or may not be different than the encryption key used by electronic device 110-1 in FIG. 1) and another digital signature.

Additionally, the counterparty payment applet may, via the interface circuit, provide the signed transaction blob (operation 632) to electronic device 110-1 (FIG. 1) using the connection. Furthermore, the counterparty payment applet may, via the interface circuit using the connection, optionally receive the confirmation (operation 634) from electronic device 110-1 (FIG. 1) that the financial transaction is complete (and, more generally, the financial-transaction status).

Figure 7:
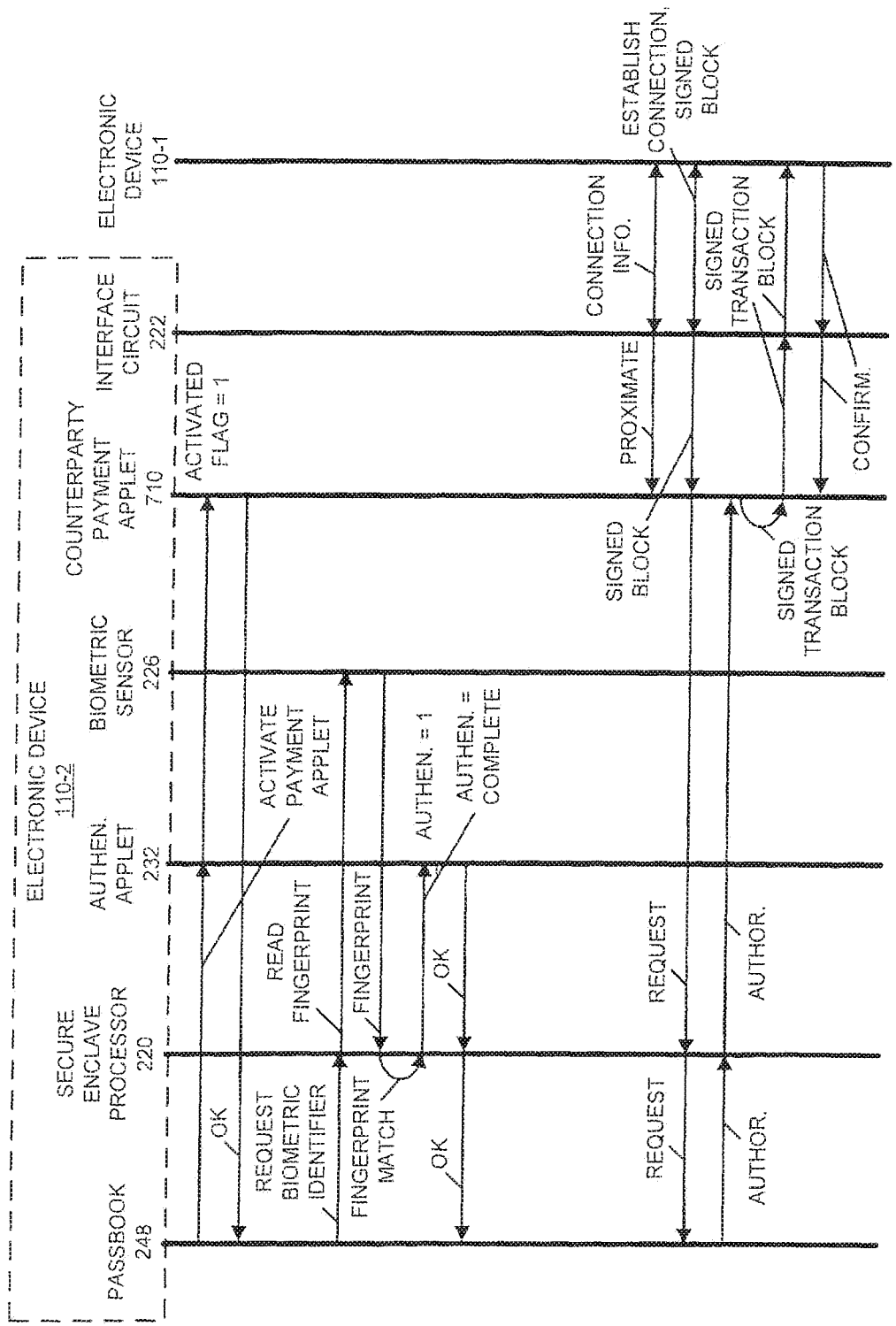
FIG. 7 is a drawing illustrating communication between the electronic devices of FIG. 1 in accordance with an embodiment of the present disclosure.

We now describe FIG. 7, which presents a drawing illustrating communication within electronic device 110-2 (FIG. 1) and between electronic devices 110-1 and 110-2 (FIG. 1), and which provides further information regarding the aforementioned financial-transaction technique of FIG. 6. In particular, passbook 248 may provide an activation command to authentication applet 232 for one of payment applets 236 in FIG. 2 (such as the counterparty payment applet 710). In response to the activation command, passbook 248 may receive the activation response from counterparty payment applet 710.

Next, passbook 248 may request biometric authentication, such as a biometric identifier. In response, secure enclave processor 220 may request biometric sensor 226 to acquire a fingerprint of the user. Biometric sensor 226 may provide the fingerprint in response to this request. If secure enclave processor 220 obtains a match with stored authentication information (such as a stored fingerprint of the user), secure enclave processor 220 may communicate the authentication-complete indicator to authentication applet 232, which may set the authentication-complete flag. Moreover, authentication applet 232 may indicate that counterparty payment applet 710 is ready for use to secure enclave processor 220, which in turn may notify passbook 248.

Subsequently, when electronic device 110-2 is proximate to electronic device 110-1, interface circuit 222 communicates the connection information and the additional connection information using near-field communication. Next, counterparty payment applet 710 (via interface circuit 222) may establish the connection with electronic device 110-1 based on the connection information and the additional connection information. Concurrently, counterparty payment applet 710 may receive the signed blob from electronic device 110-1 via interface circuit 222 using near-field communication.

In some embodiments, counterparty payment applet 710 optionally confirms user authorization via passbook 248. For example, counterparty payment applet 710 may decrypt the signed blob using the decryption key corresponding to the encryption key, and may forward a request (with the transaction amount) for authorization to passbook 248, which displays the request and may receive the user response with the authorization. Then, passbook 248 may provide the authorization to counterparty payment applet 710.

Furthermore, counterparty payment applet 710 may create the signed transaction blob based on the signed blob and the financial-account information associated with counterparty payment applet 710 using another encryption key (which may or may not be different than the encryption key used by electronic device 110-1 in FIG. 1) and another digital signature.

Additionally, counterparty payment applet 710 may, via interface circuit 222, communicate the signed transaction blob to electronic device 110-1 (FIG. 1) using the connection. Furthermore, counterparty payment applet 710 may, via interface circuit 222 using the connection, optionally receive the confirmation from electronic device 110-1 (FIG. 1) that the financial transaction is complete.

Note that the operations illustrated in FIG. 7 may include challenge and response operations, which are not shown for clarity.

While the counterparty payment applet may be gated by the activation command and the authentication-complete indicator or flag, note that the secure element may include a counterparty payment applet (such as another one of payment applets 236 in FIG. 2) that conducts a financial transaction via the interface circuit without enablement based on the authentication-complete indicator or flag. For example, the counterparty payment applet may include a mass-transit payment applet that does not require authentication before it can be used to conduct the financial transaction. Instead, the counterparty payment applet may conduct the financial transaction when the electronic device is proximate to electronic device 110-1 (FIG. 1).

In these ways, the electronic device may facilitate mobile financial transactions by providing end-to-end secure authentication and communication of the information used to conduct the financial transactions. In particular, using the communication technique, electronic device 110-1 (FIG. 1) may function as a mobile or portable point-of-sale terminal.

In some embodiments of methods 400 (FIG. 4) and 600 (FIG. 6), there may be additional or fewer operations. For example, instead of performing operations 410 and 412 in FIG. 4 (or operations 610 and 612 in FIG. 6), one of the payment applets may be defined as a default payment applet for use in financial transactions, so that it is always activated unless the user selects a different payment applet. Furthermore, the order of the operations may be changed, and/or two or more operations may be combined into a single operation.

While the preceding embodiments illustrated the communication technique using two instances of the electronic device (e.g., electronic devices 110 in FIG. 1), in other embodiments the communication technique may be performed between two different types of electronic devices.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a secure element comprising an authentication applet and a payment applet;
   an interface circuit, communicatively coupled to the secure element, wherein the interface circuit is programmed to communicate with an other electronic device; and
   wherein the secure element is programmed to execute the authentication applet in a master security domain of the secure element, and execute the payment applet in a supplemental security domain of the secure element, and wherein the secure element is further programmed to:
      receive, in the payment applet in the supplemental security domain of the secure element, a transaction amount associated with a point-of-sale transaction in response to the authentication applet authenticating user information;
      generate a signed data element based at least in part on the transaction amount;
      transmit, via the interface circuit, the signed data element and connection information to the other electronic device using a first connection based at least in part on a near-field-communication protocol;
      establish, via the interface circuit, a second connection with the other electronic device based at least in part on the connection information, wherein the second connection is based at least in part on a communication protocol other than the near-field-communication protocol;
      receive, via the interface circuit, a signed transaction data element from the other electronic device using the second connection; and
      transmit, via the interface circuit, information associated with the signed transaction data element to a server to conduct the point-of-sale transaction.

2. The electronic device of claim 1, wherein the secure element is further programmed to:
   transmit, via the interface circuit, the signed data element to the server; and
   receive, via the interface circuit, a confirmation from the server that the electronic device is authorized to conduct the point-of-sale transaction.

3. The electronic device of claim 1, wherein the server is associated with a provider of the electronic device or a payment network that processes a payment for the point-of-sale transaction using the information associated with the signed transaction data element.

4. The electronic device of claim 1, wherein the secure element is further programmed to:
   receive, at the authentication applet, the user information associated with a user of the electronic device; and
   authenticate, using the authentication applet, the user based at least in part on the received user information and stored authentication information in the electronic device.

5. The electronic device of claim 1, wherein the secure element is further programmed to:
   receive from the server, via the interface circuit, confirmation that the point-of-sale transaction was completed; and
   transmit, via the interface circuit, the confirmation to the other electronic device using the second connection.

6. The electronic device of claim 1, wherein the signed data element comprises a signed blob and the transmitting the signed data element is performed concurrently with the establishing the second connection.

7. The electronic device of claim 1, wherein the signed transaction data element comprises a signed transaction blob and the other electronic device generates the signed transaction data element based at least in part on the transaction amount and a merchant identifier.

8. The electronic device of claim 1, wherein the authentication applet is programmed to authenticate a user based on a flag type being set for the payment applet.

9. A non-transitory computer-readable storage medium storing a set of instructions which, when executed by one or more processors of a secure element in an electronic device during a point-of-sale transaction, causes the one or more processors to perform operations comprising:
   authenticating, by an authentication applet in a master security domain of the secure element, user information;
   receiving, in a supplemental security domain of the secure element, a transaction amount associated with the point-of-sale transaction in response to the authentication applet authenticating the user information;
   generating a signed data element based at least in part on the transaction amount;
   transmitting, via an interface circuit of the electronic device, the signed data element and connection information to an other electronic device using a near-field connection;
   establishing, via the interface circuit, a second connection with the other electronic device based at least in part on the connection information, wherein the second connection is based at least in part on a communication protocol other than a near-field-communication protocol; and
   completing the point-of-sale transaction with the other electronic device using the second connection, wherein the completing the point-of-sale transaction comprises:
      receiving, via the interface circuit, a signed transaction data element from the other electronic device using the second connection; and
      transmitting, via the interface circuit, information associated with the signed transaction data element to a server to conduct the point-of-sale transaction.

10. The non-transitory computer-readable storage medium of claim 9, the operations further comprising:
   transmitting, via the interface circuit, the signed data element to the server, the signed data element comprising a signed blob; and receiving, via the interface circuit, a confirmation from the server that the electronic device is authorized to conduct the point-of-sale transaction.

11. The nontransitory computer-readable storage medium of claim 9, the authenticating comprising:
   receiving, at the authentication applet, the user information associated with a user of the electronic device; and
   authenticating, using the authentication applet, the user based at least in part on the received user information and stored authentication information in the electronic device.

12. The nontransitory computer-readable storage medium of claim 9, the operations further comprising:
   receiving from the server, via the interface circuit, confirmation that the point-of-sale transaction was completed; and
   transmitting, via the interface circuit, the confirmation to the other electronic device using the second connection.

13. The nontransitory computer-readable storage medium of claim 9, wherein the transmitting the signed data element is performed concurrently with the establishing the second connection.

14. The nontransitory computer-readable storage medium of claim 9, wherein the other electronic device generates the signed transaction data element based at least in part on the transaction amount and a merchant identifier.

15. A processor-implemented method for conducting a point-of-sale transaction at an electronic device, comprising a secure element and an interface circuit, with an other electronic device, wherein the processor-implemented method comprises:
   authenticating, by an authentication applet in a master security domain of the secure element, user information;
   receiving, in a supplemental security domain of the secure element, a transaction amount associated with the point-of-sale transaction in response to the authentication applet authenticating the user information;
   generating, via the secure element, a signed data element based at least in part on the transaction amount;
   transmitting, via the interface circuit, the signed data element and connection information to the other electronic device using a near-field connection;
   establishing, via the interface circuit, a second connection with the other electronic device based at least in part on the connection information, wherein the second connection is based at least in part on a communication protocol different than a near-field-communication protocol; and
   completing the point-of-sale transaction with the other electronic device using the second connection, wherein the completing the point-of-sale transaction comprises:
      receiving, via the interface circuit, a signed transaction data element from the other electronic device using the second connection, the signed transaction data element comprising a signed transaction blob; and
      transmitting, via the interface circuit, information associated with the signed transaction data element to a server to conduct the point-of-sale transaction.

16. The processor-implemented method of claim 15, further comprising:
   transmitting, via the interface circuit, the signed data element to the server, the signed data element comprising a signed blob; and
   receiving, via the interface circuit, a confirmation from the server that the electronic device is authorized to conduct the point-of-sale transaction.

17. The processor-implemented method of claim 15, the authenticating further comprising:
   receiving, at the authentication applet, the user information associated with a user of the electronic device; and
   authenticating, using the authentication applet, the user based at least in part on the received user information and stored authentication information in the electronic device.

18. The processor-implemented method of claim 15, further comprising:
   receiving from the server, via the interface circuit, confirmation that the point-of-sale transaction was completed; and
   transmitting, via the interface circuit, the confirmation to the other electronic device using the second connection.

* * * * *